(12) United States Patent
Luo et al.

(10) Patent No.: US 6,477,582 B1
(45) Date of Patent: Nov. 5, 2002

(54) METHOD AND APPARATUS FOR CONSERVATIVE LINK SELECTION

(75) Inventors: Gang Luo, Kanata; Jianli Wang, Ottawa; Glenn Sutherland, Kanata, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/212,429

(22) Filed: Dec. 16, 1998

(51) Int. Cl.$^7$ ............................................... G06F 13/00
(52) U.S. Cl. ....................................................... 709/241
(58) Field of Search .................................. 709/200–241

(56) References Cited

U.S. PATENT DOCUMENTS 6,094,687 A * 7/2000 Drake, Jr. et al. ........... 709/241
6,104,701 A * 8/2000 Avargues et al. ........... 370/238
6,141,325 A * 10/2000 Gerstel
6,175,870 B1 * 1/2001 Gawlick et al. ............. 709/227
6,189,043 B1 * 2/2001 Buyukkoc et al. .......... 709/221

* cited by examiner

Primary Examiner—David Wiley
(74) Attorney, Agent, or Firm—Allan P. Millard (57) ABSTRACT

A method is described for path selection in communications networks with multiple QoS metrics. This method takes an additive metric (say, cost) as a path minimization target and a concave metric (say, bandwidth) as a minimum requirement for each link. A potential objective is to find a path between a source node and a destination node in a communications network such that the bandwidth of each link in the path exceeds a bandwidth requirement and the cost of the path is minimized. The method eliminates from consideration those links whose available bandwidth does not exceed a required bandwidth. The method then reassigns the cost of those links whose available bandwidth does not exceed a function of the required bandwidth. A path from the source node to the destination node is then selected, using only links still under consideration, corresponding to a path wherein cost is minimized.

19 Claims, 8 Drawing Sheets

METHOD AND APPARATUS FOR CONSERVATIVE LINK SELECTION

FIELD OF THE INVENTION

The present invention relates to link selection during connection admission control for communication networks and, in particular, conservative link selection.

BACKGROUND OF THE INVENTION

"Quality of Service" (QoS) metrics provide measures of performance. Multimedia applications such as digital video and audio often have stringent QoS requirements. To deliver performance guarantees, a network has to make resource reservations and exercise network control. In "Private Network-Network Interface Specification Version 1.0 (PNNI 1.0), " ATM Forum, 1996, resource reservation has been incorporated in the PNNI protocol for Asynchronous Transfer Mode (ATM) communication. As well, "RSVP" (ReSerVation Protocol) has been developed as a resource reservation protocol for the Internet. Multiple QoS metrics such as cost, delay, delay variation, loss probability and available bandwidth are accommodated by the PNNI protocol. As a result, the routing problem, that of achieving efficient utilization of network resources, is further complicated by these QoS metrics. The route selection problem is now to find a path from the source to the destination that satisfies all QoS constraints and has the lowest cost.

The most studied QoS metrics fall into two categories. The first category is concave, in which the aggregate metric over a path is the minimum of the values of this metric for all sections of the path. The second category is additive, in which the aggregate metric over a path is the sum of the values of this metric for all sections of the path.

A communications network may be modelled as a weighted graph where each link between two nodes is associated with certain QoS metrics as weights, such as cost and available bandwidth. Each switch on such a network may maintain a network graph with QoS weights associated with each link. It is necessary to keep the network graphs current. If, for example, available bandwidth of a link undergoes a significant change, the change is advertised by a broadcast of the new information to all other switches, called flooding. Due to the time delay of the flooding, the bandwidth information in the network graph of a particular switch may not be very accurate.

To set up a connection, a switch first selects, given the present network graph, a path from a source node to a destination node. Once a path has been selected, a call request is sent along the selected path to reserve the resources necessary for the eventual connection of the source and destination nodes. Call (or Connection.) Admission Controls (CACs) define procedures used by a switch at the edge of a network, whereby a call request is accepted or rejected based on the ability of the network to support the requested QoS. Generic CAC is used when routing a connection request through an ATM network.

In current practice, when a call setup request is received by a switch, the switch uses CAC to first eliminate all links from the present network graph which cannot satisfy the bandwidth request (see, for example, "Private Network-Network Interface Specification Version 1.0 (PNNI 1.0)," ATM Forum, 1996). Then the switch uses a path selection algorithm such as Dijkstra's algorithm to find a minimum cost path.

Dijkstra's algorithm, which was developed by Edsger Dijkstra in 1959, is a well known method described in, for example, C. Papadimitriou, K. Steiglitz, (1982), *Combinatorial Optimization: Algorithms and Complexity*, Prentice-Hall, the contents of which are incorporated herein by reference. Using the algorithm, finding the shortest path for travelling from a given vertex on a graph to every other vertex is possible. Dijkstra's algorithm takes a graph with weighted links and a given root vertex as its input and returns, as its output, a label for each vertex on the graph. In the case where the weights represent the length of the links, each vertex label represents the length of the shortest path from the root vertex to the particular vertex.

Due to inaccurate bandwidth information, a call setup request may be blocked at some node along the path, especially when the network is heavily loaded. Furthermore, since the call setup request has already reserved bandwidth along the path from the source node to the blocking node, the reserved network bandwidth resource is wasted, which in turn may cause more call blocking. More frequent flooding to increase the accuracy of the bandwidth information consumes valuable network resources and may not be acceptable.

A high call blocking rate is currently solved by lowering the traffic load which is sent to the network. Since traffic load means revenue for the network service provider, this solution may be expensive.

SUMMARY OF THE INVENTION

The method of the subject invention involves conservatively selecting links in a path from a source node to a destination node in a communication network. The method first eliminates from consideration those links between nodes in the communication network whose concave metric does not exceed a required concave metric. The method then processes those links whose concave metric does not exceed an inflated value of the required concave metric. The processing comprises either reassigning an additive metric of each such link or eliminating each such link from consideration. A path from the source node to the destination node is then selected, using only links still under consideration, corresponding to a path wherein the additive metric is minimized.

In accordance with an aspect of the present invention there is provided a method for facilitating selection of a path in a communications network comprising nodes and links between the nodes, including comparing a function of one of a required concave link metric for the path and a concave link metric associated with a link with the other of the required concave link metric for the path and the concave link metric associated with the link and if the comparing results in a pre-defined outcome, processing the link. In another aspect of the invention a router may be provided to carry out the method. In another aspect of the invention a software medium permits a general purpose computer to carry out the method. In a further aspect of the present invention there is provided a communications system including a controller for facilitating selection of a path, the controller including means for carrying out the method of the invention.

In accordance with a still further aspect of the present invention there is provided for a communication system comprising nodes and links between the nodes, a method for selecting a path from a start node to a destination node, the method including eliminating from consideration each link for which a required concave link metric exceeds a concave link metric associated with the each link, the eliminating resulting a plurality of links still under consideration. The method next includes processing each link of the plurality of links still under consideration for which either an inflating function of the required concave link metric exceeds a concave link metric associated with the link or the required concave link metric exceeds a deflating function of a concave link metric associated with the link. The method concludes by selecting a path from the source node to the destination node, using only the plurality of links still under consideration.

BRIEF DESCRIPTION OF THE DRAWINGS

In the figures which illustrate example embodiments of this invention.

DETAILED DESCRIPTION OF THE PREFERRED EMBODIMENTS

In a network having nodes and links between the nodes, we define a concave metric $A_{bw}(i, j)$ and an additive metric $C(i, j)$ for the link $(i, j)$ between each pair of nodes i and j and two specified nodes, s (the source node) and e (the end or destination node). By way of example, the additive metric, $C(i, j)$, may be the cost of the link $(i, j)$ and the concave metric, $A_{bw}(i, j)$, may be the available bandwidth of the link $(i, j)$. The objective is to find a path p(s, e) between the source node and the end node such that at least a minimum amount of bandwidth is available along the path and the cost of the path (which is the sum of link costs over the path) is minimized.

Figure 1:
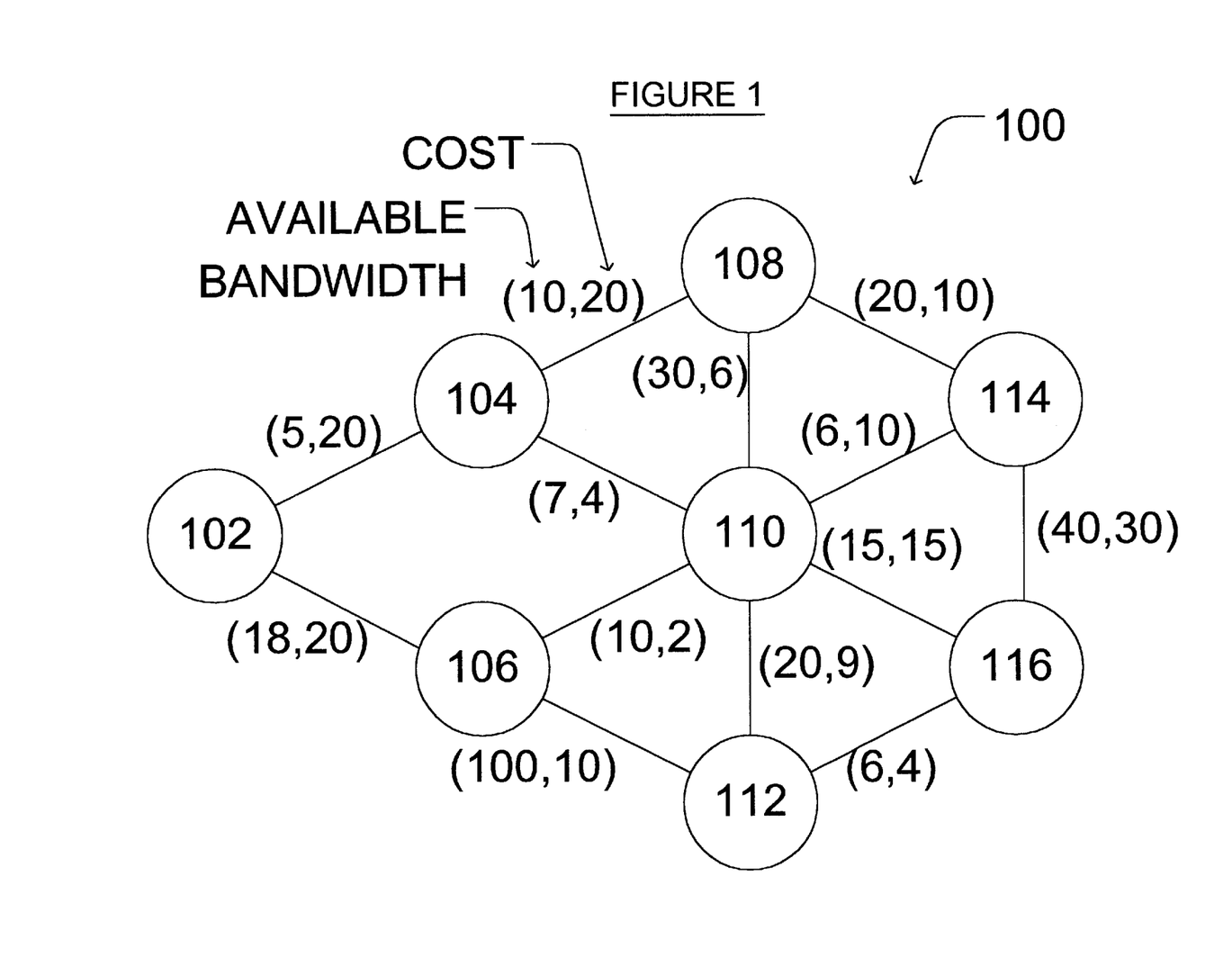
FIG. 1 is a schematic network of nodes representing a communications network.

Referring to FIG. 1, which models a communication system 100 as a graph of nodes, the link $(i, j)$ between each pair of nodes is shown to have an associated available bandwidth and cost.

Figure 2:
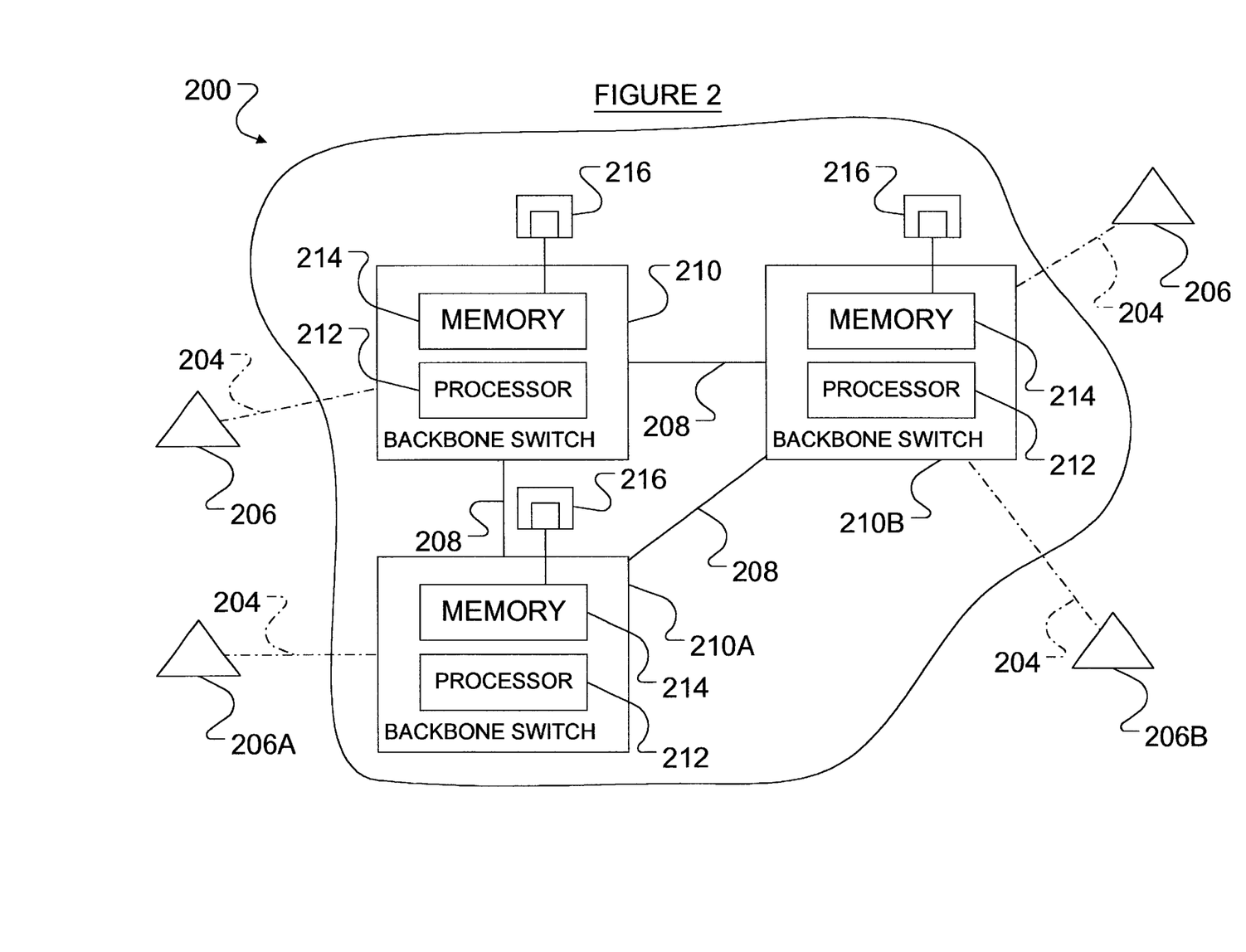
FIG. 2 schematically illustrates an ATM PNNI network suitable for use with this invention.

FIG. 2 illustrates an ATM PNNI network suitable for use with this invention. PNNI network 200 comprises a number of ATM backbone switch nodes 210 which are nodes interconnected by PNNI links 208.A number of ATM devices (work stations, servers or private ATM switches) 206 are connected to the backbone switch nodes 210 by UNI (User-to-Network Interface) 204 links. The backbone switch comprises a processor 212 and a memory 214 loaded with path selection software for executing the method of this invention from software medium 216 which could be a disk, a tape, a chip or a random access memory containing a file downloadable from a remote source.

In operation, if a backbone switch 2:LOA receives a destination ATM address from an ATM device 206A indicating a request to connect to ATM device 206B, the switch, under control of software in memory 214,undertakes the method of this invention to select an appropriate path to device 206B. In a conventional manner, the call is then set up over this path.

Figure 3:
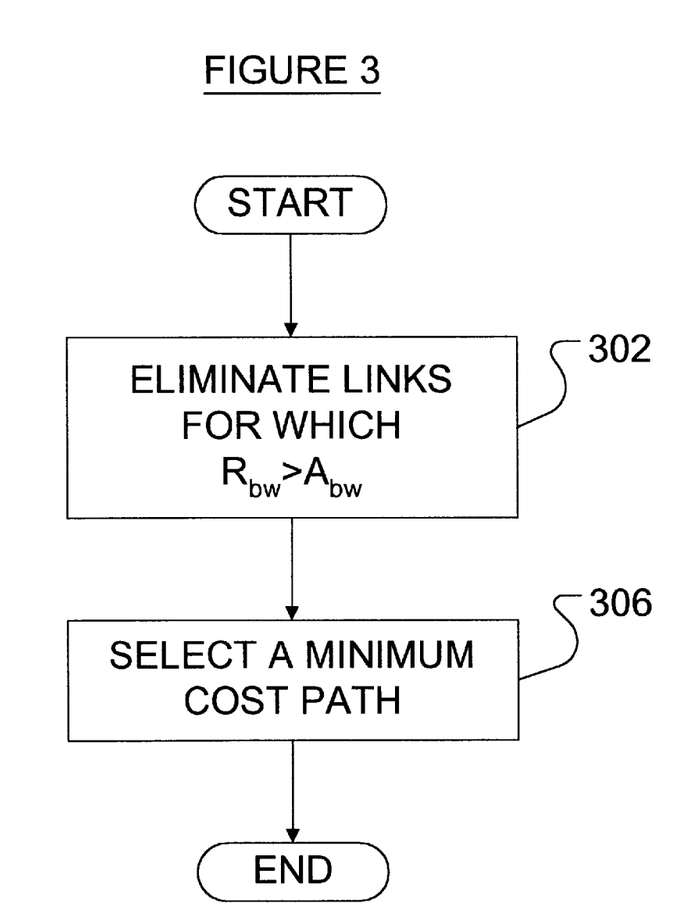
FIG. 3 illustrates a flow diagram for a known method of path selection.

Turning to FIG. 3, a flow diagram of a known method for considering available bandwidth when performing path selection is illustrated. Let $R_{bw}$ be the bandwidth required by a particular call setup request. For a particular link $(i, j)$, if the required bandwidth is greater than the available bandwidth (i.e., $R_{bw} > A_{bw}(i, j)$) the link $(i;, j)$ is eliminated from the graph (step 302). A path is then selected (step 306) from the links remaining in the graph using, for instance, Dijkstra's algorithm.

Figure 4:
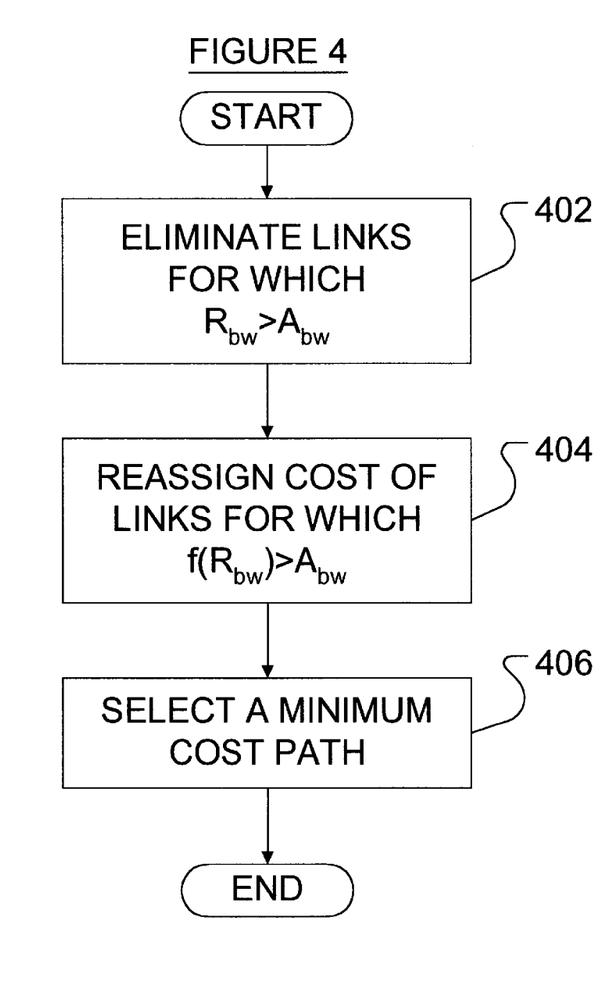
FIG. 4 illustrates a flow diagram for a method of path selection in accordance with an embodiment of the invention.

Illustrated in FIG. 4 is a method for considering available bandwidth when performing path selection in an embodiment of this invention. For a particular link $(i, j)$, if the required bandwidth is greater than the available bandwidth (i.e., $R_{bw} > A_{bw}(i, j)$) the link is eliminated from the graph (step 402). Otherwise (i.e., where $R_{bw} < A_{bw}(i, j)$), if a specified inflated value of the required bandwidth is greater than the available bandwidth, the cost of the link may be reassigned to a higher value. The value of $R_{bw}$ is inflated by taking a function of same and comparing this with $A_{bw}(i, j)$. Thus, if $f(R_{bw}) > A_{bw}(i, j)$, the cost of link $(i, j)$ is reassigned. For example, the cost reassignment could be $C(i, j) = C(i, j) + k*C_{MAX}$, where parameter k may be determined by simulation and where $C_{MAX}$ is the cost of the greatest cost link in the graph. Function $f(R_{bw})$ may be defined as follows:

$$f(R_{bw}) = \begin{cases} Z_1 \times R_{bw}, & \text{for } X_1 \le R_{bw} < Y_1 \\ Z_2 \times R_{bw}, & \text{for } X_2 \le R_{bw} < Y_2 \\ \ldots, & \\ Z_n \times R_{bw} & \text{for } X_n \le R_{bw} < Y_n \end{cases}$$

where $n, Z_1, \ldots, Z_n, X_1, \ldots, X_n, Y_1, \ldots, Y_n$, are parameters which may be determined by running simulations based on the network graph and the expected load. A minimum cost path is then selected from the links remaining in the graph in a conventional manner (step 406).

As will be apparent to a person skilled in the art, $f(R_{bw})$ may be a continuous, rather than noncontinuous, function. Included in the set of continuous functions are functions independent of requested bandwidth, $R_{bw}$.

In the result, links with sufficient but marginal bandwidth are assigned higher apparent costs. This reduces the number of these links which will be selected in choosing the minimum cost path. Because of this, the chosen path is more likely to allow a successful call setup, even where link cost and bandwidth information is somewhat out of date.

Figure 5:
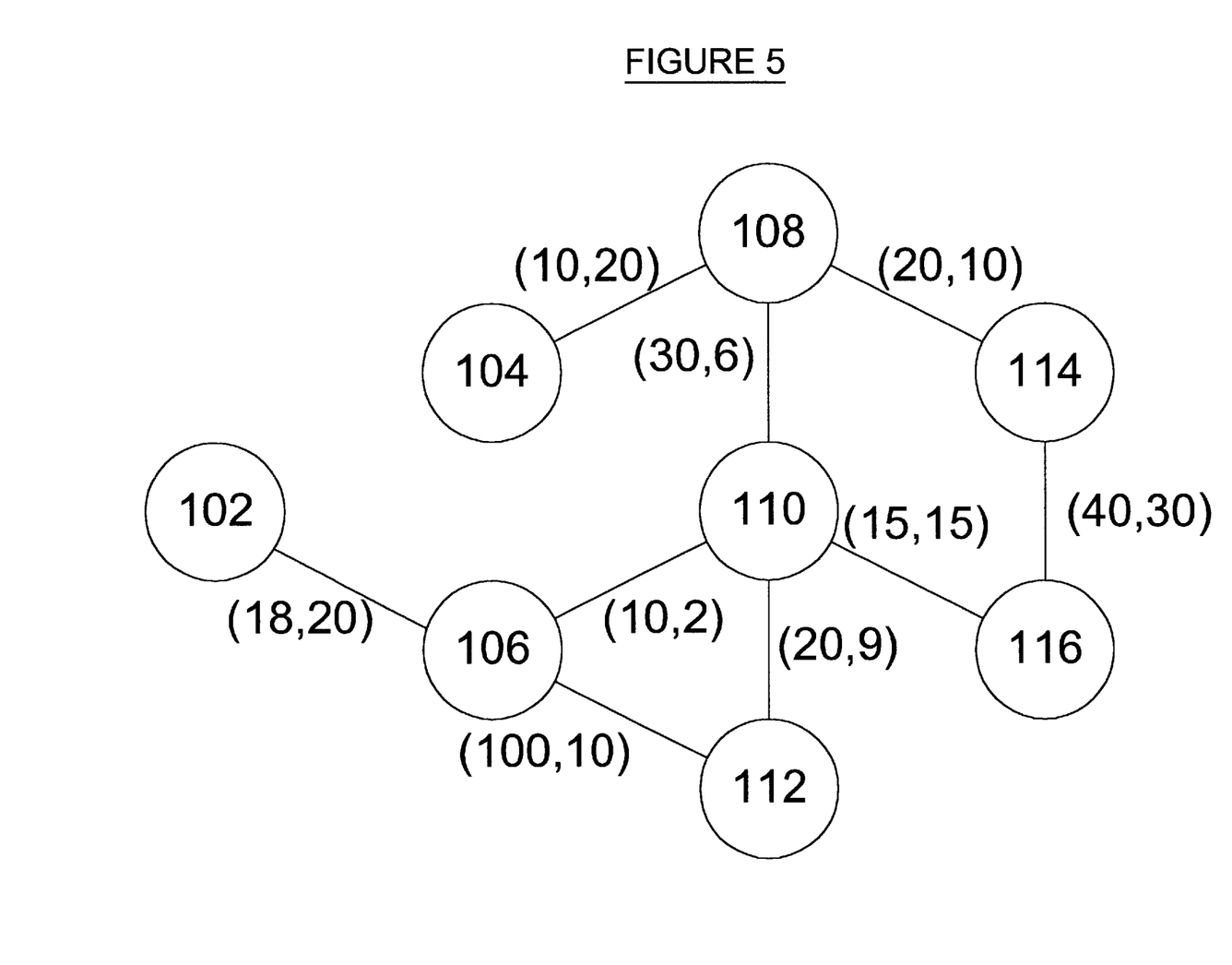
FIGS. 5–7 illustrate an example of the application of FIG. 4 to the network of FIG. 1.
Figure 6:
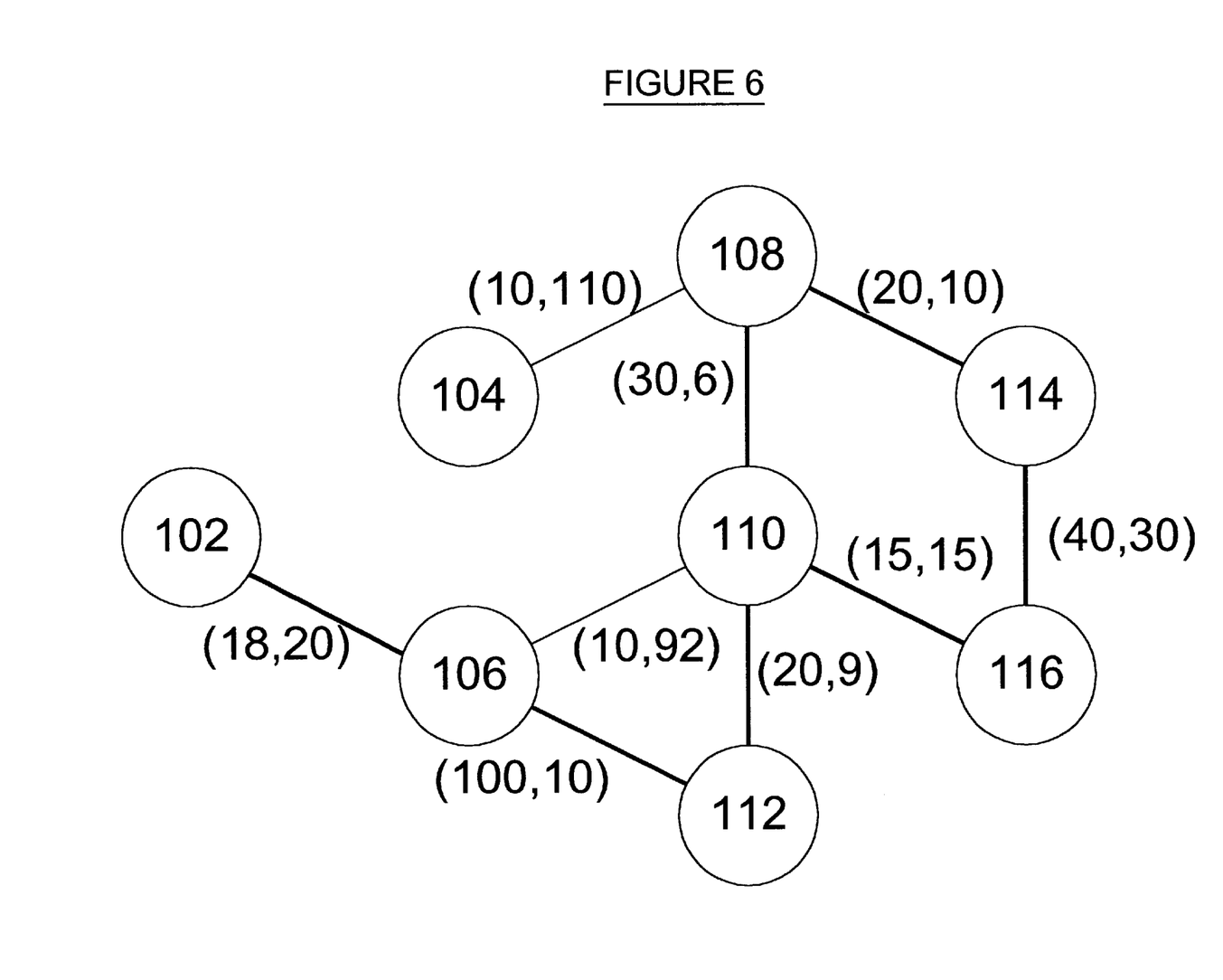
Figure 7:
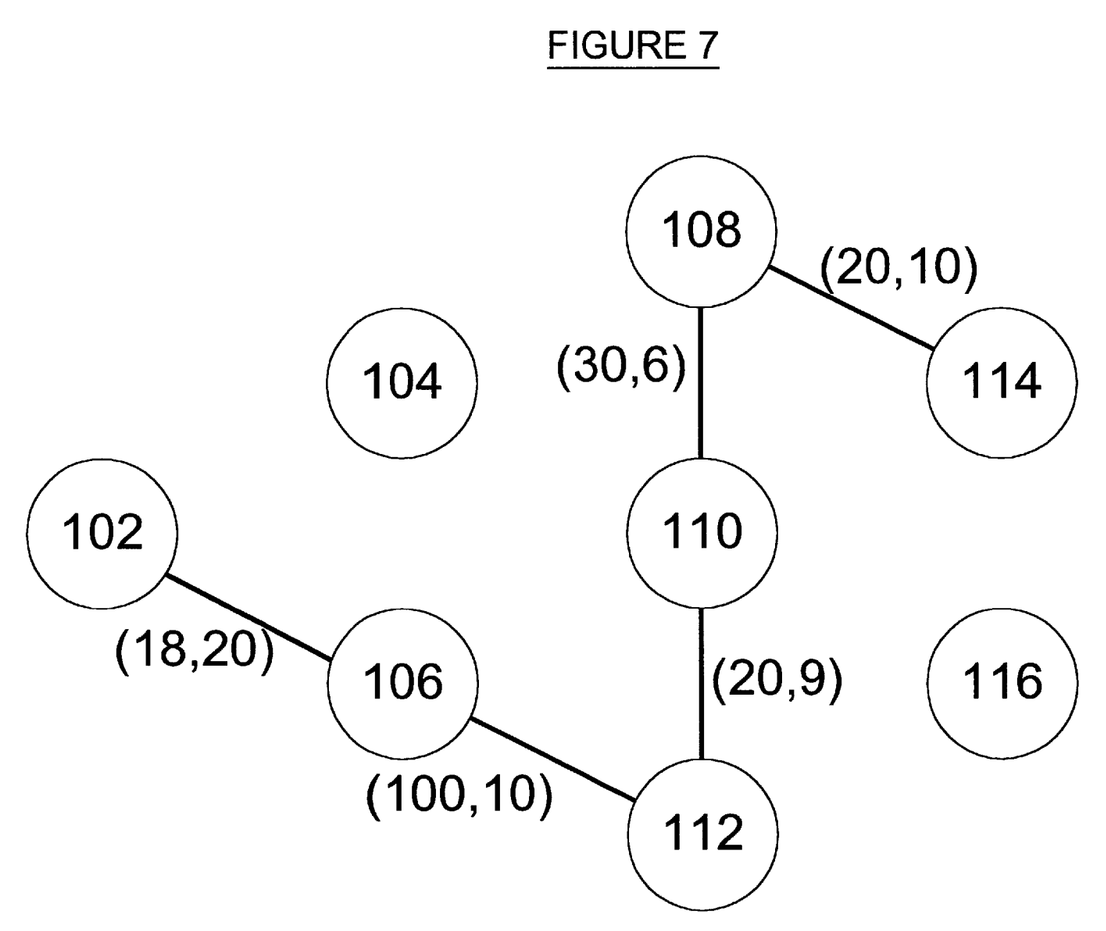

By way of example consider the network of FIG. 1 into which a call setup request is sent, identifying the source node, s, as node 102,the destination node, e, as node 114 and a required bandwidth, $R_{bw}$, of 7 bandwidth units. As well, define $f(R_{bw}) = 2 \times R_{bw}$ and k=3. Considering FIG. 1 in conjunction with FIG. 4, each link whose available bandwidth is less than the requested bandwidth is eliminated (step 402) resulting in the network of FIG. 5. Next, 90 cost units ($k \times C_{MAX} = 3 \times 30$) are added to the cost, $C(i, j)$, of each remaining link $(i, j)$ whose available bandwidth is less than twice the required bandwidth (step 404). The result of step 404,for this example, is the network of FIG. 6, where the bold links indicate those links whose costs have not been reassigned. Finally, all remaining links are considered in selecting a path with minimum cost (step 406). Path selection may be performed in a conventional manner, using, for instance, Dijkstra's algorithm. The result of step 406,for this example, is the path [102, 106, 112, 108, 114] illustrated in FIG. 7.

Figure 8:
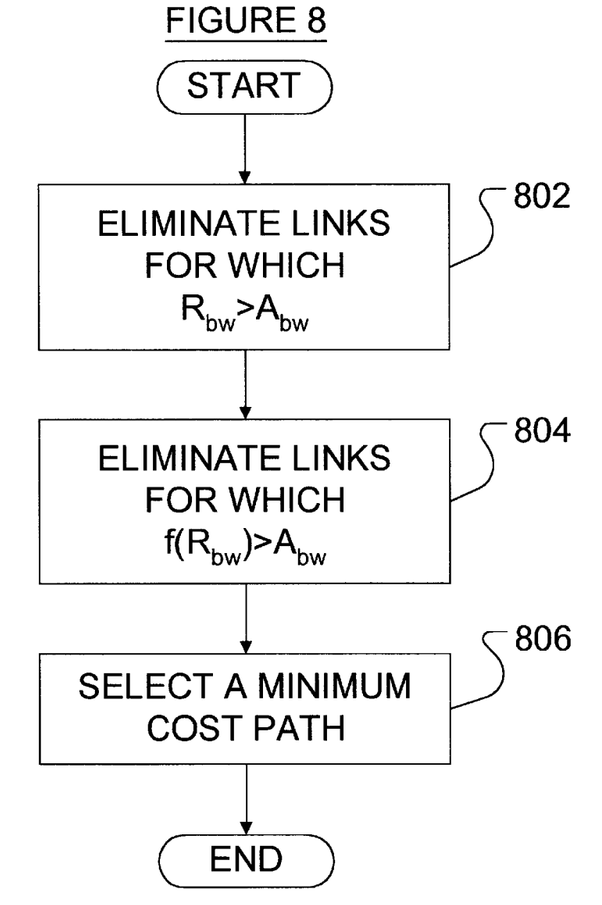
FIG. 8 illustrates a flow diagram for a method of path selection in accordance with another embodiment of the invention.

FIG. 8 illustrates a flow diagram of an alternative embodiment. For a particular link $(i, j)$, as before, if the required bandwidth is greater than the available bandwidth (i.e., $R_{bw} > A_{bw}(i, j)$) the link (i, j) is eliminated from the graph (step 802). Subsequently, all links. for which a function, f, of the required bandwidth (which provides an inflated value) is greater than the available bandwidth are eliminated from the network graph (step 804). A path is then computed from the links remaining in the graph (step 806).

Although the method of this invention has been presented in conjunction with ATM PNNI networks, it will be understood that the method is applicable to networks employing different protocols, such as the Internet Protocol (IP).

A person skilled in the art will understand that rather than process those links that fail to exceed an inflating function of the required concave metric, those that exceed a function of the required concave metric may be processed. For example, the cost of each link whose available bandwidth exceeds an inflating function of the required bandwidth may be reduced.

It will also be understood that decisions regarding processing links may be taken based upon a comparison of a required concave metric to a deflating function of a concave metric associated with a link rather than a comparison of a concave metric associated with a link to an inflating function of the required concave metric as disclosed.

While the exemplary additive link metric is the cost of a link which is to be minimized, the additive link metric could, instead, be a metric which is to be maximized.

Other modifications will be apparent to those skilled in the art and, therefore, the invention is defined in the claims.

We claim:

1. A method of selecting a path in a communications network comprising nodes and links connecting the nodes, the links having assigned both a concave and an additive link metric, the method comprising:
    (a) eliminating links in the network for which a required concave link metric exceeds the assigned concave link metric associated with each respective link, the eliminating resulting in a plurality of links still under consideration;
    (b) processing each of the plurality of links still under consideration, wherein the processing includes evaluating each of the plurality of links with an inflating function associated with the concave link metric and reassigning a higher value to the additive link metric of the link under evaluation, if the value calculated using the inflating function is greater than the assigned concave link metric; and
    (c) selecting a path through the network which minimizes the additive link metric.

2. The method of claim 1 wherein the network is an ATM PNNI network.

3. The method of claim 1 wherein the concave link metric is bandwidth.

4. The method of claim 1 wherein the additive link metric is cost.

5. The method of claim 1 wherein the inflating function is continuous.

6. The method of claim 1 wherein the inflating function is non-continuous.

7. A backbone switch node in an ATM PNNI network comprising nodes and PNNI links connecting said nodes, the backbone switch comprising:
    (a) a processor for processing requests to connect from a first ATM device connected to the network to a second ATM device connected to the network; and
    (b) a memory communicating with said processor, the memory including computer-executable instructions, which, when executed by the processor, cause the processor to:
        (i) eliminate links in the network for which a required concave link metric exceeds the assigned concave link metric associated with each respective link, the eliminating resulting in a plurality of links still under consideration;
        (ii) process each of the plurality of links still under consideration, wherein the processing includes evaluating each of the plurality of links with an inflating function associated with the concave link metric and reassigning a higher value to the additive link metric of the link under evaluation, if the value calculated using the inflating function is greater than the assigned concave link; and
        (iii) select a path through the network which minimizes the additive link metric.

8. The backbone switch node of claim 7 wherein the memory is taken from the group comprising disks, tapes, chips, and RAM.

9. The backbone switch node of claim 7 wherein the concave link metric is bandwidth.

10. The backbone switch node of claim 7 wherein the additive link metric is cost.

11. The backbone switch node of claim 7 wherein the inflating function is continuous.

12. The backbone switch node of claim 7 wherein the inflating function is non-continuous.

13. A computer-readable medium having contained thereon computer-executable instructions, which, when processed by a processor in a backbone switch cause the processor to:
    (a) eliminate links in the network for which a required concave link metric exceeds the assigned concave link metric associated with each respective link, the eliminating resulting in a plurality of links still under consideration;
    (b) process each of the plurality of links still under consideration, wherein the processing includes evaluating each of the plurality of links with an inflating function associated with the concave link metric and reassigning a higher value to the additive link metric of the link under evaluation, if the value calculated using the inflating function is greater than the assigned concave link; and
    (c) select a path through the network which minimizes the additive link metric.

14. The computer-readable medium of claim 13 wherein the concave link metric is bandwidth.

15. The computer-readable medium of claim 13 wherein the additive link metric is cost.

16. The computer-readable medium of claim 13 wherein the inflating function is continuous.

17. The computer-readable medium of claim 13 wherein the inflating function is non-continuous.

18. A method of selecting a path in a communications network comprising nodes and links connecting the nodes, the links having assigned both a concave and an additive link metric, the method comprising:
    (a) eliminating links in the network for which a required concave link metric exceeds the assigned concave link metric associated with each respective link, the eliminating resulting in a plurality of links still under consideration;
    (b) processing each of the plurality of links still under consideration, wherein the processing includes evaluating each of the plurality of links with an inflating function associated with the concave link metric and reassigning a lower value to the additive link metric of the link under evaluation, if the value calculated using the inflating function is less than the assigned concave link metric; and (c) selecting a path through the network which minimizes the additive link metric.

19. A method of selecting a path in a communications network comprising nodes and links connecting the nodes, the links having assigned both a concave and an additive link metric, the method comprising:

(a) eliminating links in the network for which a required concave link metric exceeds the assigned concave link metric associated with each respective link, the eliminating resulting in a plurality of links still under consideration;

(b) processing each of the plurality of links still under consideration, wherein the processing includes evaluating each of the plurality of links with an inflating function associated with the concave link metric and eliminating the selected link, if the value calculated using the inflating function is greater than the assigned concave link metric; and selecting a path through the network which minimizes the additive link metric.

* * * * *